Jan. 1, 1974  HIROSHI UCHIKAWA ET AL  3,782,992
CEMENT SET RETARDING COMPOSITION AND METHOD
Filed Dec. 23, 1971                           2 Sheets-Sheet 1

3,782,992
CEMENT SET RETARDING COMPOSITION
AND METHOD
Hiroshi Uchikawa, Funabashi, and Shunichiro Uchida, Tokyo, Japan, assignors to Onoda Cement Co., Ltd., Onoda-shi, Yamaguchi-ken, Japan
Filed Dec. 23, 1971, Ser. No. 211,307
Claims priority, application Japan, Dec. 29, 1970, 46/121,500
Int. Cl. C04b 3/22, 7/00, 13/00
U.S. Cl. 106—315        4 Claims

ABSTRACT OF THE DISCLOSURE

A hydraulic cement composition comprises (a) the clinker containing 5–60% by weight of $$11CaO \cdot 7Al_2O_3 \cdot CaX_2$$

(X represents halogen atom), more than 5% by weight of $3CaO \cdot SiO_2$ solid solution, and further $2CaO \cdot SiO_2$ solid solution and $4CaO \cdot Al_2O_3 \cdot Fe_2O_3$ $$(4CaO \cdot Al_2O_3 \cdot Fe_2O_3$$

represents $$2CaO \cdot Fe_2O_3 \cdot 6CaO \cdot 2Al_2O_3 \cdot Fe_2O_3$$

system solid solution); (b) anhydrite with or without hemihydrate and (c) at least one of sulfates, nitrates and chlorides of potassium, sodium, magnesium, calcium, aluminum or ammonium (excepting $CaSO_4 \cdot 2H_2O$, $CaSO_4$ and $CaSO_4 \cdot \tfrac{1}{2}H_2O$), whereby the anhydrite is contained in an amount that $Al_2O_3/SO_3$ weight ratio of $Al_2O_3$ in the clinker and $SO_3$ in the anhydrite is 0.7–1.8 and hemihydrate gypsum is contained less than 5% by weight as $SO_3$.

---

This invention relates to a hydraulic cement composition, and, particularly, to a hydraulic cement composition which can be suitably regulated of setting time, and which has high strength at the initial and the later stages.

When the mixed raw materials comprising siliceous, and aluminous material as well as a small amount of halide such as fluorite, calcium chloride, etc. are sintered, the initial crystallization region of calcium aluminate $$(3CaO \cdot Al_2O_3)$$

is extremely narrowed and the clinker obtained will not contain calcium aluminate, but $11CaO \cdot 7Al_2O_3 \cdot CaX_2$ as a stable phase, and thus the clinker containing $$11CaO \cdot 7Al_2O_3 \cdot CaX_2,$$

as well as $3CaO \cdot SiO_2$, $2CaO \cdot SiO_2$, $4CaO \cdot Al_2O_3 \cdot Fe_2O_3$, etc. is obtained.

$11CaO \cdot 7Al_2O_3 \cdot CaX_2$ component has a high hydration activity and a greater hardenability, and the cement containing it develops strength in the initial stage of several hours, and further by incorporation of calcium silicate (especially $3CaO \cdot SiO_2$ solid solution), the hydraulic cement having improved strength development in the early stage (12 hours to 3 days) and later stage is obtained.

The only above-mentioned clinker is flash-setting, and its early strength is low. However, we have found that, if anhydrite (or anhydrite gypsum) with or without hemihydrate (or hemihydrate gypsum) and at least one of the above-mentioned sulfates, nitrates, and chlorides are added to the clinker, setting time thereof is retarded and the improved cement having good workability and excellent strength development property at the initial and the later stages can be obtained.

The object of this invention is to provide the hydraulic cement composition which can be suitably regulated of setting time, and which provides good workability and a high initial strength, and maintains, after mixed with water, a high strength for a long period of time.

Another object of this invention is to provide a method for regulating the setting of the cement.

According to the present invention, there is provided the hydraulic cement composition which comprises (a) the clinker containing 5–60% by weight of $$11CaO \cdot 7Al_2O_3 \cdot CaX_2$$

(X represents a halogen atom), more than 5% by weight of $3CaO \cdot SiO_2$ solid solution, and further $2CaO \cdot SiO_2$ solid solution and less than 15% by weight of $$4CaO \cdot Al_2O_3 \cdot Fe_2O_3$$

(b) anhydrite with or without hemihydrate; and (c) at least one of sulfates, nitrates, and chlorides or potassium, sodium, magnesium, calcium, aluminum or ammonium (excepting hemihydrate gypsum $CaSO_4 \cdot \tfrac{1}{2}H_2O$, anhydrous gypsum $CaSO_4$ and dihydrate gypsum $$CaSO_4 \cdot 2H_2O)$$

whereby the anhydrite is contained in an amount that $Al_2O_3/SO_3$ weight ratio of $Al_2O_3$ in the clinker and $SO_3$ in the anhydrite is 0.7–1.8.

As another feature of the present invention there is also provided the method for regulating the setting time and for improving the early and later strength development of the hydraulic cement comprising the clinker containing $11CaO \cdot 7Al_2O_3 \cdot CaX_2$ (X represents a halogen atom), more than 5% by weight of $3CaO \cdot SiO_2$ and further $2CaO \cdot SiO_2$ solid solution and less than 15% by weight of $4CaO \cdot Al_2O_3 \cdot Fe_2O_3$ and anhydrite with or without semihydrate; whereby the anhydrite is contained in an amount that $Al_2O_3/SO_3$ weight ratio of $Al_2O_3$ in the clinker and $SO_3$ in the anhydrite is 0.7–1.8; the method comprising admixing at least one of sulfates, nitrates and chlorides of potassium, sodium, magnesium, calcium, aluminum or ammonium (excepting $CaSO_4 \cdot \tfrac{1}{2}H_2O$, $CaSO_4$ and $CaSO_4 \cdot 2H_2O$), in an amount of 0.1–5% by weight as $SO_3$ for sulfate, 0.1–7% by weight as $NO_3$ for nitrate, and 0.1–7% by weight as Cl for chloride with the abovementioned cement together with water.

The present invention can be more fully understood from the following detailed description when taken in conjunction with reference to the accompanying drawings, in which.

Figure 1:
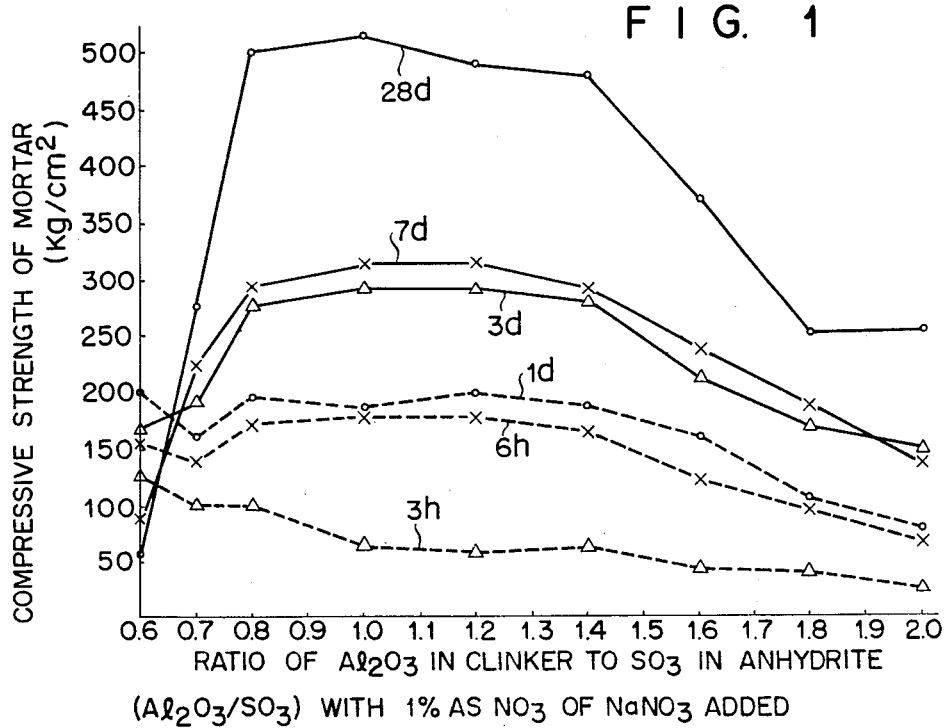
FIG. 1 shows the relation between the compressive strength of the cement mortar comprising the clinker, anhydrite and $NaNO_3$, and $Al_2O_3/SO_3$ ratio.

We have now discovered the methods for improving the early and later strength development and regulating setting time of the above-mentioned cement, and obtained the cement compositions which are satisfactory in workability, when used as mortar or concrete, and maintain high strength over a long period of time.

Our experimental research has revealed that addition of at least one of sulfate, nitrates and chlorides of potassium, sodium, magnesium, calcium, aluminum or ammonium (excepting hemihydrate gypsum $CaSO_4 \cdot \frac{1}{2}H_2O$, $CaSO_4$ and dihydrate gypsum $CaSO_4 \cdot 2H_2O$) together with anhydrite to the clinker is effective in obtaining good workability of mortar or concrete, and addition of a suitable amount thereof contributes to the improvement of strength development in the initial and later stages.

Also it has been found that addition of an excess amount of these additives not only over-retards setting time but lowers the initial and early strengths, and the resulting cement products are no longer provided with the above-mentioned improved proportions. And it has been revealed that in order to realize the characteristics of the cement compositions of this invention, a preferred clinker should contain 5–60% by weight (unless specifically indicated, percentage is by weight hereinafter) of $11CaO \cdot 7Al_2O_3 \cdot CaX_2$ (X represents a halogen atom, and the same hereinafter), more than 5% of $3CaO \cdot SiO_2$ solid solution as the mineral composition thereof and at least one of the above-mentioned sulfates, nitrates and chlorides should be added respectively in an amount of 0.1–5% as $SO_3$, 0.1–7% as $NO_3$ or 0.1–7.0% as Cl to the clinker when the most excellent results are expected.

It has been found, too, that addition of the above-mentioned additives is not sufficient for desirable development of strength, and the combined use of anhydrite is essential. One or more of these sulfate, nitrate and chloride additives can be admixed with the clinker and anhydrite with or without in the hemihydrate state of powder, or can be added thereto by dissolving in a mixing water in a suitable concentration.

Also it has been revealed that, when one or more of the sulfates, nitrates and chlorides are added in the form of powder or a solution in mixing water to the mixture of the above-mentioned clinker, anhydrite and hemihydrate, the initial strength of the cement is somewhat lowered than when hemihydrate is excluded from the mixture, but strength after the early stage is remarkably increased.

As has been explained above, existence of anhydrite is responsible for the initial and later high strength development. The results of our experimental study tell that the strength remarkably develops when anhydrite is mixed in an amount that $Al_2O_3/SO_3$ ratio of the amount of $Al_2O_3$ in the clinker and the amount of $SO_3$ in the gypsum is 0.7–1.8% by weight. Outside of this range, the strength decreases.

Now the invention is illustrated by practical embodiment.

The clinker was prepared by pulverizing and mixing white clay as a siliceous material, bauxite as an aluminous material, quick lime as calcareous material, fluorite as a calcium halide, copper slag as iron source and shaping the resulting mixture and finally sintering it at 1320–1350° C. The thus obtained clinker was ground to powder having Blaine specific surface area of 3700 cm.²/g. The composition of this clinker analyzed by chemical analysis and by X-ray diffraction analysis are as shown in Table 1.

TABLE 1

Chemical composition (percent):
| | |
|---|---|
| $SiO_2$ | 17.7 |
| $Al_2O_3$ | 12.9 |
| $Fe_2O_3$ | 2.4 |
| CaO | 62.3 |
| MgO | 0.6 |
| Total | 95.9 |

TABLE 1.—Continued

Mineral composition (percent):
| | |
|---|---|
| $11CaO \cdot 7Al_2O_3 \cdot CaF_2$ | 23 |
| $3CaO \cdot SiO_2$ | 52 |

In the composition of Table 1, $11CaO \cdot 7Al_2O_3 \cdot CaF_2$ is a component responsible for development of strength in the initial and the early stages, and $3CaO \cdot SiO_2$ is responsible for development of strength at early stage and later stages.

Examples of the additives added to the clinker of Table 1 are shown in Table 2. These substances were ground by a triturator to the same fineness as that of the clinker. Anhydrite and hemihydrate were prepared by the method as explained hereinafter using the starting materials listed in Table 3.

TABLE 2

| No.: | Additive |
|---|---|
| 1 | Aluminum potassium sulfate. |
| 2 | Potassium sulfate. |
| 3 | Aluminum sulfate. |
| 4 | Sodium sulfate. |
| 5 | Magnesium sulfate. |
| 6 | Ammonium sulfate. |
| 7 | Potassium nitrate. |
| 8 | Sodium nitrate. |
| 9 | Calcium nitrate. |
| 10 | Magnesium nitrate. |
| 11 | Aluminum nitrate. |
| 12 | Ammonium nitrate. |
| 13 | Potassium chloride. |
| 14 | Sodium chloride. |
| 15 | Calcium chloride. |
| 16 | Magnesium chloride. |
| 17 | Aluminum chloride. |
| 18 | Ammonium chloride. |

NOTE: All the materials listed in Table 2 are pure chemicals.

TABLE 3

| | |
|---|---|
| Ignition loss | 21.1 |
| $SiO_2 + Fe_2O_3 + Al_2O_3$ | 1.8 |
| CaO | 31.3 |
| $SO_3$ | 45.6 |
| Total | 99.8 |

Natural gypsum having a composition of Table 3 was used to produce the following products.

Hemihydrate: The natural gypsum of Table 3 was kept at 160° C. for 3 hours and was cooled and ground to powder having a Blaine specific surface area of 5,000 cm.²/g.

Anhydrite: The natural gypsum of Table 3 was heated at 700° C. in an electric furnace for 1 hour, and was cooled and ground to powder having a Blaine specific surface area of 3,300 cm.²/g.

These gypsum products were used after the chemical form thereof was determined by thermal analysis such as differential thermal analysis or thermobalance method.

In order to determine the relation between the amount of an additive to be used and the setting time and compressive strength after setting; the setting time and compressive strength of mortar were determined with respect to the cement in which each of the additives of Table 2 was singly mixed, and in which anhydrite was mixed in combination with any of the above-mentioned additives in an amount that $Al_2O_3/SO_3$ ratio of $Al_2O_3$ in the clinker and $SO_3$ in the gypsum is 1.0 by weight.

The initial and final setting time of mortar determined in accordance with the test method for setting of paste described in JIS R5201, using a sample of which the cement/(Toyoura) standard sand ratio is 1:2, and W/C is 0.55.

The compressive strength was determined according to the test method for strength of mortar described in JIS R5201. Thus the relation between the setting time and strength of mortar and the amount of the used additive ($NaNO_3$ as a representative) was determined. The results are shown in Table 4.

TABLE 4

| No. | Amount of $NaNO_3$ in percent by wt. as $NO_3$ | Setting time of mortar (minutes) | | Compressive strength of mortar (kg./cm.²) | | | | State of mortar sample when mixed with water |
|---|---|---|---|---|---|---|---|---|
| | | Initial | Final | 3 hrs. | 6 hrs. | 1 day | 3 days | |
| 1 | 0.3 | 3 | 4 | 19.5 | 50.4 | 91.2 | 103 | Dryish. |
| 2 | 1.0 | 6 | 8 | 14.6 | 27.7 | 80.5 | 112 | |
| 3 | 5.0 | 11 | 17 | 9.6 | 13.2 | 51.2 | 76.4 | Easy to handle. |
| 4 | 8.0 | 21 | 30 | | | 39.2 | 48.8 | Watery. |

In Table 4, out of many additives of Table 2, the results with respect to only sodium nitrate are shown. The other additives listed in Table 2 gave the same results as Table 4. That is to say, as the amount of these additives added increases, setting time is retarded. And with increase of the amount of the additive, the compressive strength in the initial stage as well as in the early stage is lowered.

Figure 2:
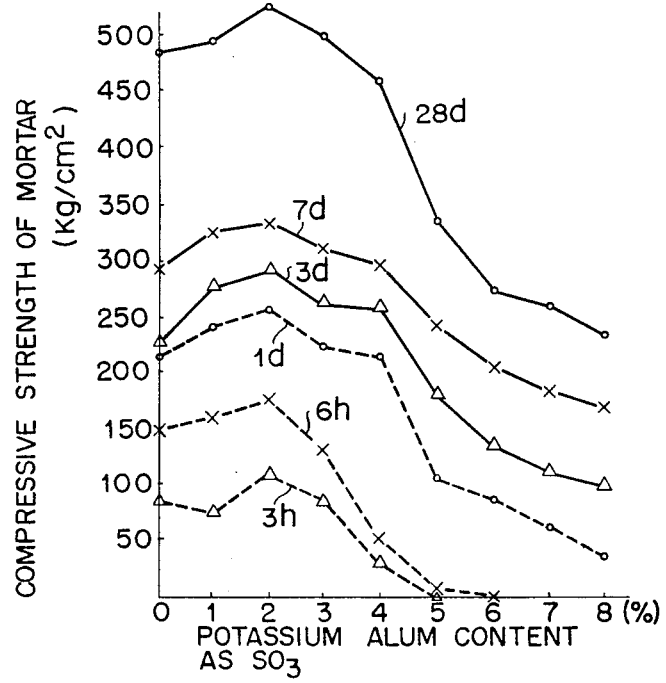
FIG. 2 shows the relation between the compressive strength of the cement mortar and potassium alum content.
Figure 3:
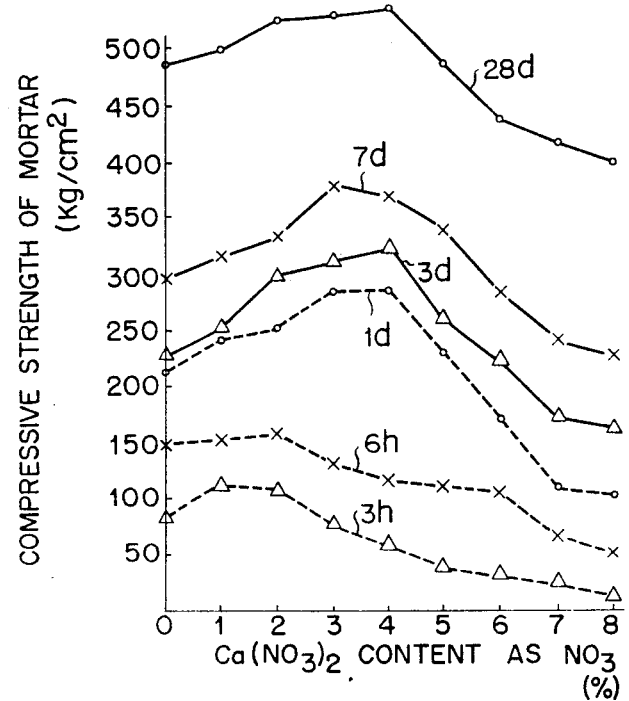
FIG. 3 shows the same relation as in FIG. 2 when calcium nitrate is added instead of potassium alum.
Figure 4:
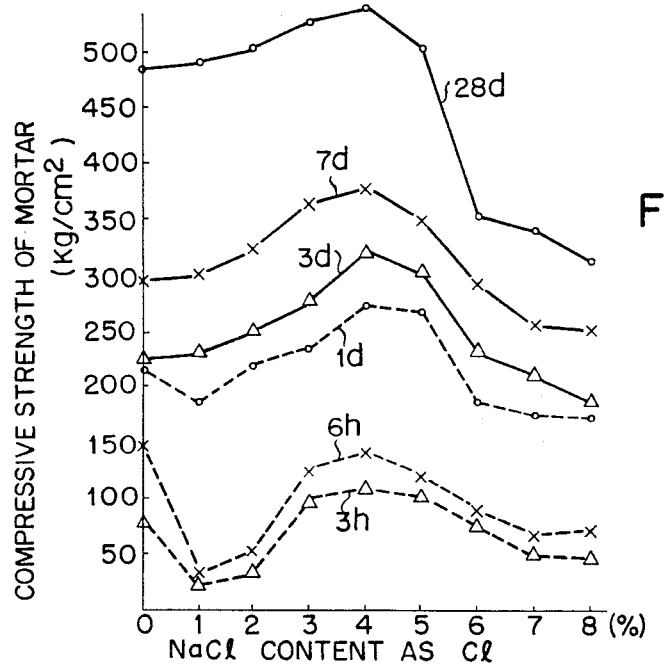
FIG. 4 shows the same relation as in FIG. 2 when sodium chloride is added instead of potassium alum.

In contrast with the above-mentioned, it has been found that when anhydrite is used in combination with the additive of Table 2, strengths in the initial and later stage develops remarkably, although setting time is prolonged somewhat longer than when the additive is used alone. This fact tells that existence of anhydrite is essential for realization of extremely high initial and later strength.

range from 0.7 to 1.8. When the ratio is less than 0.7, cracking and crumbling of mortar specimen occur, and when the ratio is more than 1.8, development of strength is deteriorated. The same experiments were repeated with respect to potassium alum, sodium chloride, calcium nitrate etc. as setting regulating agent and almost the same results were obtained. Further the same experiments were repeated with respect to cements prepared by mixing the clinker of Table 1 and 15% (on the basis of the weight of the clinker) of anhydrite and 3% (on the basis of the weight of the clinker) of hemihydrate and further adding sulfates, nitrates and chlorides as the additional components. The results of these experiments are shown in FIGS. 2, 3 and 4, and in Table 7.

Table 6 shows the relation between the setting time and compressive strength of mortar when anhydrite and hemihydrate were added to the clinker.

TABLE 5

| Number | Additive, amount | Setting time of mortar (mins.) | | Compressive strength (kg./cm.²) | | | | | |
|---|---|---|---|---|---|---|---|---|---|
| | | Initial | Final | 3 hrs. | 6 hrs. | 1 day | 3 days | 7 days | 28 days |
| 1 | $NaNO_3$ 0.3% as $NO_3$ | 8 | 10 | 52.9 | 109 | 158 | 254 | 304 | 485 |
| 2 | $NaNO_3$ 1.0% as $NO_3$ | 15 | 20 | 64.3 | 186 | 189 | 291 | 311 | 512 |
| 3 | $NaNO_3$ 5.0% as $NO_3$ | 21 | 28 | 60.5 | 196 | 224 | 256 | 293 | 496 |
| 4 | $NaNO_3$ 8.0% as $NO_3$ | 43 | 62 | | 13.4 | 34.6 | 133 | 169 | 256 |
| 5 | $MgSO_4$ 0.3% as $SO_3$ | 9 | 11 | 73.1 | 152 | 309 | 218 | 252 | 425 |
| 6 | $MgSO_4$ 1.0% as $SO_3$ | 14 | 18 | 82.5 | 135 | 230 | 236 | 295 | 464 |
| 7 | $MgSO_4$ 5.0% as $SO_3$ | 24 | 30 | 79.0 | 158 | 198 | 248 | 313 | 504 |
| 8 | $MgSO_4$ 7.0% as $SO_3$ | 53 | 84 | | | | 54.5 | 112 | 218 |
| 9 | $CaCl_2$ 0.3% as $Cl$ | 9 | 13 | 31.4 | 72.7 | 196 | 216 | 286 | 507 |
| 10 | $CaCl_2$ 1.0% as $Cl$ | 16 | 20 | 49.1 | 80.3 | 217 | 225 | 318 | 524 |
| 11 | $CaCl_2$ 5.0% as $Cl$ | 20 | 32 | 61.4 | 125 | 224 | 253 | 325 | 512 |
| 12 | $CaCl_2$ 8.0% as $Cl$ | 40 | 59 | | | 20.6 | 103 | 146 | 283 |

NOTE.—The amounts of the additives (percent) are based on the weight of the clinker with anhydrite.

In the cement compositions of Table 5, $Al_2O_3$ $SO_3$ ratio that is, the ratio of $Al_2O_3$ in the clinker and $SO_3$ in the anhydrite was 1.0.

The relation between the setting time and compressive strength and amount of used additives was studied with respect to the clinkers containing 5–60% of $11CaO \cdot 7Al_2O_3 \cdot CaX_2$ and more than 5% of $3CaO \cdot SiO_2$ and further $2CaO \cdot SiO_2$, $4CaO \cdot Al_2O_3$, etc. The results have revealed that initial setting time can be regulated to the range of about 7–30 minutes, and regulating so is very desirable for realizing good workability and the high initial and later strength when the cement is used as mortar or concrete. Further it has been established that, in order to regulate the initial setting time to 7–30 minutes, the above-mentioned additives should be used preferably in an amount of 0.1–5% as $SO_3$ for sulfates, 0.1–7% as $NO_3$ for nitrates, and 0.1–7% as $Cl$ for chloride.

The results of the study on optimum amount of anhydrite to be added are as follows.

FIG. 1 shows the relation between $Al_2O_3/SO_3$ ratio and the compressive strength of mortar, when sodium nitrate as a representative of setting regulating agents of this invention was used in an amount of 1.0% as $NO_3$ and various amount of anhydrite was added to the clinker.

By this experiment, it has been established that in order to realize extremely high initial and later strength in the above-mentioned clinker, anhydrite should be used in an amount that the $Al_2O_3/SO_3$ weight ratio is within the

TABLE 6

Mixing ratio of gypsums (percent):[1]
    Anhydrous _____ 3
    Hemihydrate _____ 15
Setting time (min):
    Initial _____ 12
    Final _____ 18
Compressive strength of mortar (kg./cm.²):
    3 hrs. _____ 85.3
    6 hrs. _____ 149
    1 days _____ 212
    3 days _____ 225
    7 days _____ 298
    28 days _____ 485

[1] On the basis of the weight of the clinker.

In FIGS. 2 to 4, the abscissae respectively represent the amount of potassium alum, $Ca(NO_3)_2$ and $NaCl$ added in percentage as $SO_3$, $NO_3$ and $Cl$ respectively.

Table 7 shows setting time and compressive strength of mortar for various amounts of the setting regulators, of this invention, that is, potassium alum, calcium nitrate and sodium chloride.

FIGS. 2 to 4 show the relation between compressive strength of mortar and the amount of the setting regulators added. It is apparent that incorporation of sulfate, nitrate, chloride in addition to hemihydrate is remarkably effective for improvement in compressive strength of early and later period.

The results tell that although addition of these additives somewhat lowers initial strength, strength development in the early and later period is remarkably improved in comparison with the case in which no additives are used. However, there is a limit in the amount of addition of these additives. Generally it is suitable to admix the additives to the range of 0.1–5% as $SO_3$ for sulfate, 0.1–7% as $NO_3$ for nitrate and 0.1–7% as Cl for chloride. And it is essential to regulate so that the initial setting time of mortar is within a range of from 7 to 40 minutes.

of a big mixer so as to obtain the clinker having a composition as shown in Table 8.

TABLE 8

| Clinker | Chemical composition (percent) | | | | | | | | | Free lime | Mineral composition (percent) | |
|---|---|---|---|---|---|---|---|---|---|---|---|---|
| | $SiO_2$ | $Al_2O_3$ | $Fe_2O_3$ | CaO | MgO | $SO_3$ | $Na_2O$ | $K_2O$ | Total | | 11 CaO·$Al_2O_3$·$CaX_2$ | $3CaO·SiO_2$ |
| A | 15.9 | 15.7 | 2.3 | 61.9 | 0.5 | 1.2 | 0.08 | 0.07 | 97.6 | 0.2 | X=F 27 | 51 |
| B | 17.8 | 15.1 | 2.0 | 61.5 | 0.4 | 1.0 | 0.03 | 0.05 | 97.9 | 0.1 | X=Cl 25 | 44 |

Note.—Mineral composition was determined by means of X-ray diffraction analysis.

The obtained clinker was mixed with gypsums listed in Table 9, sodium chloride, $KAl(SO_4)_2$ (purity 95% or more) and $NaNO_3$ (purity 98% or more) respectively, and each mixture was tested for setting time and mortar strength by the test methods JIS R5201. The results are summarized in Table 10.

TABLE 7

| Additive | Amount of addition (percent) | Setting time of mortar (mins.) | | Compressive strength of mortar (kg./cm.²) | | | | | |
|---|---|---|---|---|---|---|---|---|---|
| | | Initial | Final | 3 hrs. | 6 hrs. | 1 day | 3 days | 7 days | 28 days |
| Potassium alum (as $SO_3$) | 1 | 25 | 37 | 74.2 | 162 | 244 | 271 | 325 | 493 |
| | 3 | 14 | 25 | 88.0 | 133 | 223 | 260 | 312 | 500 |
| | 5 | 12 | 20 | | 8.4 | 105 | 182 | 247 | 338 |
| | 7 | 42 | 65 | | | 62.1 | 113 | 184 | 262 |
| | 8 | 95 | 125 | | | 36.4 | 99.6 | 171 | 235 |
| Calcium nitrate (as $NO_3$) | 1 | 18 | 23 | 112 | 155 | 244 | 252 | 313 | 498 |
| | 3 | 20 | 35 | 76.3 | 134 | 286 | 312 | 379 | 528 |
| | 5 | 17 | 24 | 43.1 | 115 | 233 | 265 | 343 | 493 |
| | 7 | 31 | 56 | 27.8 | 66.7 | 112 | 175 | 243 | 417 |
| | 8 | 53 | 98 | 15.1 | 55.2 | 103 | 167 | 232 | 403 |
| Sodium chloride (as Cl) | 1 | 25 | 41 | 25.0 | 37.2 | 182 | 231 | 299 | 487 |
| | 3 | 18 | 26 | 100 | 125 | 237 | 275 | 365 | 524 |
| | 5 | 14 | 22 | 102 | 122 | 267 | 303 | 350 | 503 |
| | 7 | 14 | 20 | 50.2 | 69.3 | 174 | 204 | 256 | 342 |
| | 8 | 48 | 65 | 48.8 | 69.5 | 173 | 193 | 251 | 312 |

Note.—Calcium nitrate was added to mixing water in the form of a solution thereof. The other two additives were added to the clinker in the form of powder.

As has been observed in the above, when anhydrite with or without hemihydrate is added to cement clinker in an amount that the ratio of $Al_2O_3$ in the clinker and $SO_3$ in the anhydrite, that is, $Al_2O_3/SO_3$ ratio is between 0.7 and 1.8 in accordance with the invention of this application, the strengths of mortar in the early and later period remarkably develops. In contrast, when a hydraulic cement clinker is merely mixed with water, flash setting occurs.

From the above explained facts, it is apparent that addition of anhydrite with or without hemihydrate, the salt additive in accordance with this invention contributes to regulation of setting of mortar and improvement of strength in the initial and later period far more than anticipated from the knowledge based on the standard of the prior art. And therefore, this invention makes a great contribution to the cement industry.

Now the invention is illustrated by means of working example.

EXAMPLE

White clay, white bauxite, quicklime, copper slag and a small amount of gypsum as well as fluorite, calcium chloride were ground by a shaft ball mill 85 cm. in diameter and 100 cm. in length, and were mixed by means

TABLE 9

| Gypsum | Ignition loss | $SiO_2$ | $Al_2O_3+Fe_2O_3$ | CaO | MgO | $SO_3$ | Total |
|---|---|---|---|---|---|---|---|
| Hemihydrate | 6.1 | 1.8 | 0.9 | 37.5 | 0.2 | 53.6 | 100.1 |
| Anhydrite | | 1.9 | 1.0 | 40.0 | 0.3 | 57.2 | 100.4 |

TABLE 10

| Clinker | Additive | Composition | | Setting of mortar (mins.) | | Compressive strength of mortar (kg./cm.²) | | | | | |
|---|---|---|---|---|---|---|---|---|---|---|---|
| | | Anhydrous gypsum | Hemihydrate gypsum | Initial | Final | 3 hrs. | 6 hrs. | 1 day | 3 days | 7 days | 28 day |
| (A) 79 | NaCl, 3 | 18 | | 15 | 24 | 96.1 (18.6) | 114 (24.5) | 206 (43.6) | 256 (50.3) | 307 (65.9) | 484 (90.6) |
| (A) 79 | Potassium alum, 3 | 18 | | 15 | 22 | 108 (20.4) | 126 (30.2) | 195 (38.2) | 234 (48.5) | 296 (54.6) | 438 (85.7) |
| (A) 79 | $NaNO_3$, 3 | 18 | | 14 | 24 | 84.5 (16.8) | 156 (37.2) | 212 (42.4) | 258 (51.2) | 313 (64.3) | 485 (93.4) |
| (A) 78 | NaCl, 2 | 17 | 3 | 21 | 43 | 62.3 (13.4) | 105 (22.6) | 225 (45.1) | 285 (52.7) | 336 (65.8) | 525 (98.7) |
| (B) 79 | NaCl, 2 | 18 | | 18 | 30 | 101 (22.4) | 125 (29.6) | 221 (47.4) | 243 (52.4) | 268 (54.6) | 467 (87.7) |

NOTES:
1. Values in parentheses show bending strength (kg./cm.²).
2. The amount of additive is weight of used additive.

What we claim is:

1. A hydraulic cement composition consisting essentially of: (a) a clinker containing 5–60% by weight of $11CaO·7Al_2O_3·CaX_2$ (wherein X represents a halogen atom), more than 5% by weight of a $3CaO·SiO_2$ solid solution, and further $2CaO·SiO_2$ solid solution and less than 15% by weight of $4CaO·Al_2O_3·Fe_2O_3$; (b) anhydrite; and (c) at least one compound selected from the group consisting of a potassium, sodium, magnesium, aluminum and ammonium sulfate, nitrate and chloride, a calcium nitrate and a calcium chloride, wherein said anhydrite is contained in an amount such that the $Al_2O_3/SO_3$ weight ratio of $Al_2O_3$ in the clinker and $SO_3$ in the anhydrite is 0.7–1.8, said compound is contained in an amount of 0.1–5% by weight as $SO_3$ for sulfates, 0.1–7% by weight as $NO_3$ for nitrates and 0.1–7% by weight as Cl for chlorides, the setting time of (a) being retarded by (b) and (c) and said composition being characterized by a compressive strength of at least 31.4 kg./cm.² after 3 hours.

2. A hydraulic cement composition as described in claim 1, wherein the composition further contains hemihydrate less than 5% as $SO_3$.

3. A method for retarding the setting time of a hydraulic cement which comprises:

adding to a clinker together with water a suitable amount of at least one compound selected from the group consisting of a potassium, sodium, magnesium, aluminum and ammonium sulfate, nitrate and chloride, a calcium nitrate and a calcium chloride; and mixing the whole components;

said clinker comprising 5–60% by weight of $11CaO \cdot 7Al_2O_3 \cdot CaX_2$ (wherein X represents a halogen atom), more than 5% by weight of $3CaO \cdot SiO_2$ solid solution, $2CaO \cdot SiO_2$ solid solution and less than 15% by weight of $4CaO \cdot Al_2O_3 \cdot Fe_2O_3$ and anhydrite in an amount such that the $Al_2O_3/SO_3$ weight ratio of $Al_2O_3$ in the clinker and $SO_3$ in the anhydrite is 0.7–1.8;

said suitable amount being 0.1–5% by weight as $SO_3$ for sulfates, 0.1–7% by weight as $NO_3$ for nitrates and 0.1–7% by weight as Cl for chlorides; the resulting cement having a compressive strength of at least 31.4 kg./cm.² after 3 hours.

4. A method for retarding the setting time of the hydraulic cement composition as described in claim 3, wherein the composition contains hemihydrate in an amount of less than 5% by weight as $SO_3$.

References Cited
UNITED STATES PATENTS

| | | | |
|---|---|---|---|
| 3,628,973 | 12/1971 | Greening | 106—89 |
| 3,429,725 | 2/1969 | Keenum et al. | 106—89 |
| 3,429,724 | 2/1969 | Keenum et al. | 106—89 |

ALLEN B. CURTIS, Primary Examiner

M. L. BELL, Assistant Examiner

U.S. Cl. X.R.

106—89